March 12, 1968
M. L. McCUNN
3,372,536
COTTON HARVESTER
Filed March 11, 1965
2 Sheets-Sheet 1
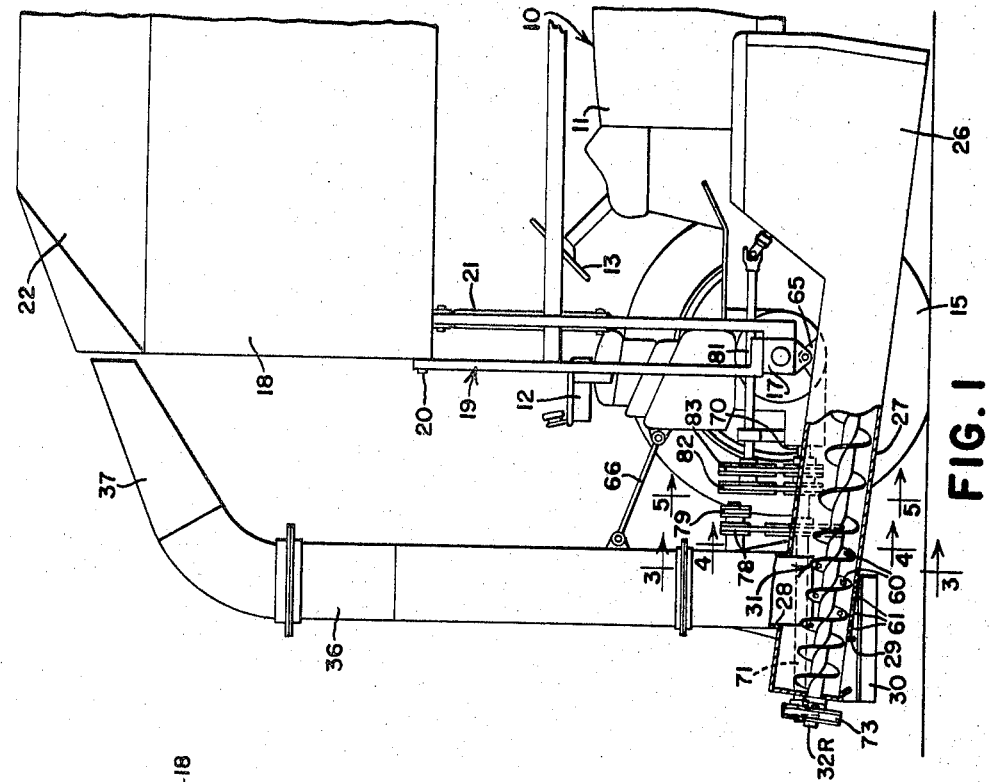
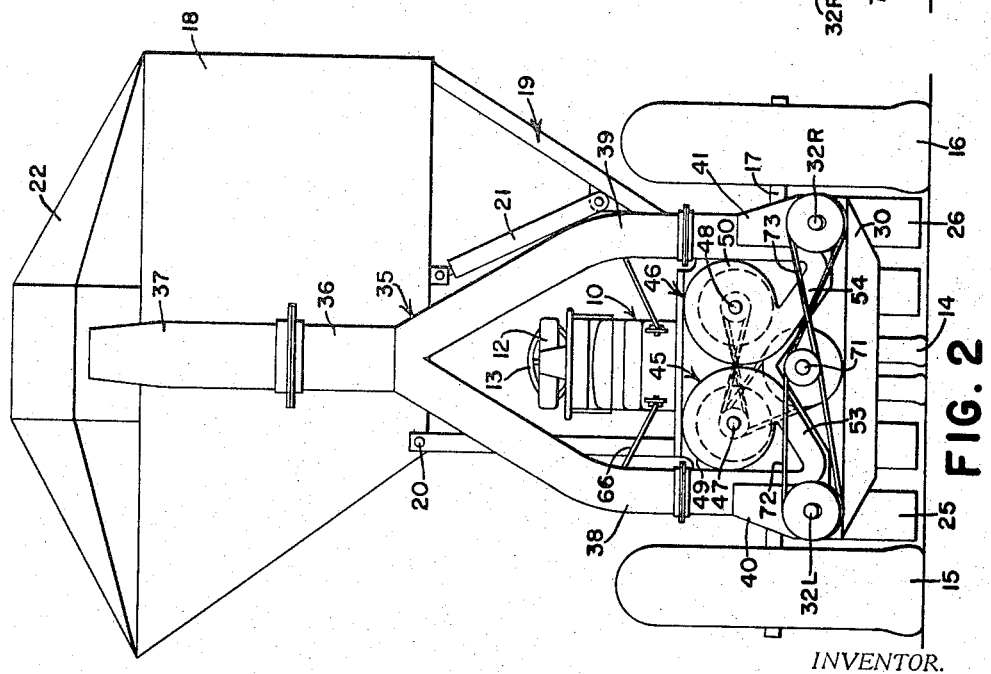
INVENTOR.
MYRON L. McCUNN
BY William A. Murray
ATTORNEY March 12, 1968     M. L. McCUNN     3,372,536
COTTON HARVESTER
Filed March 11, 1965     2 Sheets-Sheet 2
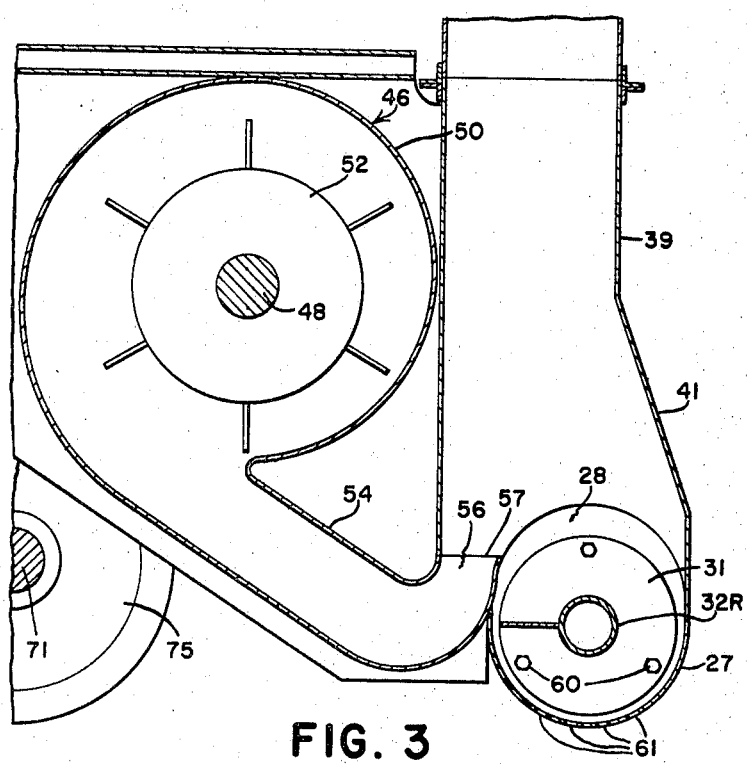
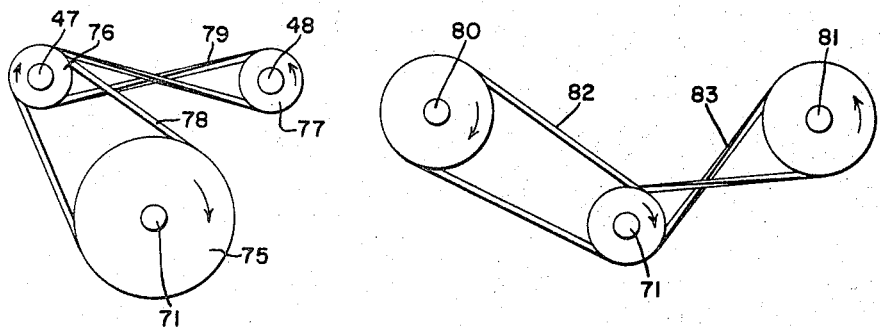
INVENTOR.
MYRON L. McCUNN
BY William A. Murray
ATTORNEY

United States Patent Office 3,372,536
Patented Mar. 12, 1968

3,372,536
COTTON HARVESTER
Myron L. McCunn, Dallas Center, Iowa, assignor to Deere & Company, Moline, Ill., a corporation of Delaware
Filed Mar. 11, 1965, Ser. No. 438,848
14 Claims. (Cl. 56—12)

ABSTRACT OF THE DISCLOSURE

A discharge means for a cotton harvester comprising an elongated housing mounted adjacent the harvesting mechanism so as to receive cotton bolls removed by the mechanism from cotton plants, the housing having a ripe boll outlet and a green boll outlet, a conveyor within the housing moving bolls first by the ripe boll outlet and from thence to the green boll outlet; a duct extending from the housing and in communicating relation with the ripe boll outlet; a blower having an outlet opening into the duct in offset relation to the ripe boll outlet and directed away from the latter to effect suction of the ripe bolls through the ripe boll outlet; and a green boll container for receiving the greener bolls gravitating from the green boll outlet.

---

This invention relates to a cotton harvester. More particularly this invention relates to conveying and trash separating means used in conjunction with the harvester.

In some of the more conventional type cotton harvesters, the harvester is composed basically of a main mobile frame, usually in the form of an agricultural tractor, that carries a pair of row crop units on opposite sides of the tractor body and as the tractor advances over the field the row crop units will harvest the respective rows of cotton plants. In this type of cotton harvester the harvesting mechanism will indiscriminately pick both the ripe and green cotton bolls from the plants. Since the intermingled green and ripe cotton bolls are not conventionally stored together, it becomes necessary to separate them.

With the above in mind it is the main object of the present invention to provide in combination with the aforementioned type of cotton harvester a conveying and separating means that separates trash and green bolls from the cotton while conveying the ripened cotton bolls to a collecting container.

In the particular type of conveying and separating mechanism contemplated in the present invention, it is proposed to use the elongated fore-and-aft extending auger conveyor contained within a housing that removes the commingled cotton bolls rearwardly from the harvesting mechanism. Each of the auger housings have an upwardly opening outlet for discharging the ripened cotton bolls and a downwardly opening outlet for discharging the green cotton bolls and heavier trash remaining with the mixture. The green boll outlet is offset rearwardly from the ripe boll outlet. Positioned to one side of the auger housing is a blower having a blower outlet directed into a vertically extending duct, the lower end of which is in communication with the ripe boll outlet. The blower outlet opens into a duct above the ripe boll outlet and is directed away from the outlet. Such a construction creates a suction or vacuum at the ripe boll outlet that raises the light or ripe cotton bolls and moves them into the duct for discharge into an awaiting container. The green cotton bolls and heavier trash, however, remain in the auger housing and is moved along by the auger flighting to the green boll outlet to be discharged downwardly into a green boll catcher or container.

It is a further object of the invention to provide the auger flighting with a reduced pitch as it passes under the ripe boll outlet so as to reduce the rate of movement rearwardly so that ample time may be had to suck the cotton through the outlet.

Other objects and advantages of the present invention will become apparent to those skilled in the art as the nature of the invention becomes apparent from the following description and as shown in the accompanying drawings.

FIG. 1 is a side view of a portion of a tractor and the cotton harvester with portions thereof removed to show internal mechanism.

FIG. 2 is a rear view of the structure shown in FIG. 1.

FIG. 3 is an enlarged sectional view taken substantially along the line 3—3 of FIG. 1.

FIG. 4 is a sectional view taken substantially along the line 4—4 of FIG. 1.

FIG. 5 is a sectional view taken substantially along the line 5—5 of FIG. 1.

The cotton harvester implement is supported on a main mobile frame or tractor 10 having a fore-and-aft extending body 11 with an operator's station thereon as indicated by an operator's seat 12 and a steering wheel 13. The body 11 is supported at its forward end by front steerable wheels 14 and at its rear end by transversely spaced traction wheels 15, 16 carried on transverse axle structure 17. A cotton receiving container or basket 18 is supported by framework 19 on the tractor body 10 and the axle structure 17 in a suitable manner, the exact manner not being imporant for the purposes of the present invention. The framework 19 carries fore-and-aft extending pivot shaft means 20 on which the basket 18 may pivot. Hydraulic cylinders 21 are provided between the framework 19 and the underside of the basket 18 and operates to tilt the basket about the shaft means 20 and to the left side so that material may be discharged. A lid 22 is provided on the top of the basket and as the basket tilts it opens automatically in a conventional manner.

The harvesting mechanism is composed of a pair of harvesting units 25, 26 positioned on opposite sides of the tractor body 11 and disposed generally forwardly of the axle structure 17. The exact nature of the harvesting mechanisms 25, 26 is not important for purposes of the present invention. One of several methods may be utilized such, for example, as shown in U.S. Patent 2,729,045, which issued to N. F. Andrews Jan. 3, 1956. However, it should be recognized that the harvesting units are of the type that generally harvest both ripe and green cotton bolls from the plant.

The cotton harvested by the row units 25, 26 is transferred to rearwardly extending side conveyors including auger housings, such as is shown at 27 on the right side, that projects rearwardly beneath the axle structure 17. The auger housing 27 has an upwardly opening forward discharge outlet 28 and a downwardly opening green boll discharge opening 29. The opening 29 is offset rearwardly from the opening 28 so as to permit the discharge of the ripe bolls prior to the discharge of the green bolls. Positioned directly beneath the green boll discharges on opposite sides of the tractor is a green boll catcher or container 30 that receives the green bolls passing through the outlets 29. Contained in each of the housings 27 is a fore-and-aft extending auger 31 operating to move the commingled ripe and green bolls from the forward harvesting mechanism rearwardly beneath the axle structure 17 and to locations adjacent the outlets 28, 29. The individual flights of auger 31 have a relatively large pitch forward of the outlets 28 and have a relatively small pitch beneath the outlet 28 and above the outlet 29, the purpose being to permit the bolls to move slower in their rearward movement as they pass adjacent the outlets 28, 29. The augers 31 for the respective row units are supported on fore-and-aft extending inclined auger shafts 32L and 32R respectively. A duct system is provided for raising the ripened cotton bolls from the respective augers 31 of the left and right harvesting units 25, 26. The duct system is composed of an upright inverted Y-shaped duct assembly 35 consisting of an upper vertically disposed portion 36 having a terminal end 37 bent forwardly and directed toward the basket lid 22. Lower downwardly extending leg portions 38, 39 have lower vertical sections opening into the respective opening 28 of the left- and right-hand auger housings. As may be seen from FIGS. 2 and 3, the respective duct sections 38, 39 are offset slightly inwardly from the respective auger housings and each have outwardly flaring panels 40, 41 at their lower ends that extend outwardly to the outer sides of the respective auger housings. As may be seen from FIG. 3, the auger 31 and opening 28 only partially directly underlies the duct section 39. Disposed inwardly of the respective lower duct sections 38, 39 and inwardly of the left- and right-hand auger housings is a pair of blowers 45, 46. Blower shafts 47, 48 are centrally located in blower housings 49, 50 and have rotary type fan blade structures 52 fixed thereto for rotation within the respective housings. The fan housings 49, 50 terminate in downwardly and outwardly extending blower ducts 53, 54 that have upwardly directed outlets as shown at 56 in FIG. 3 disposed alongside and inwardly of the respective auger housings. Referring to FIG. 3, it will be noted that the upper edge 57 of the outlet 56 is above the auger 31 and is so formed as to direct the air issuing therefrom upwardly into the lower duct section 39. The outer wall of the duct 54 adjacent the outlet 56 is common with the inner wall of the auger housing 27. A similar arrangement is provided for the left-hand blower 45 and its auger housing.

Again referring to FIG. 3 for a detailed explanation of the operation of the blower in respect to the auger 31, the shaft 48 and fan blade structure 52 are rotated to direct a relatively strong blast of air through the duct 54 and directly upwardly into the lower vertical duct section 39. Due to the pressure in the stream of air issuing from the outlet 56 there is a vacuum or suction created to the right of the stream of air and through the ripe boll outlet 28 in the auger housing 27. The suction created raises or suspends the ripe bolls being moved by the auger 31 and sucks them through the opening 28 and into the main blast of air to be directed into the duct 39. The green bolls are retained in the lower trough portion of the housing 27 and continue to move rearwardly until they reach the green boll outlet 29 at which time they gravitate into the green boll box 30. Due to the reduced pitch of the flighting 31 the rate of rearward movement of the commingled mixture of bolls is reduced so that ample time is provided to remove the ripened bolls from the mixture. Also provided on the auger flight beneath the outlet 28 are aggressive means or lugs, in the present instance bolt and nut combinations 60, that extend through the flight 31 and operate to agitate the commingled mixture as the mixture moves under the opening 28. Small air openings 61 are provided at the base of the auger trough, also directly beneath the opening 28, so as to permit air relieving the suction to pass through the opening 28 and to raise the ripened cotton bolls.

The entire harvesting mechanism is supported on the axle structure 17 of the main mobile implement 10 as shown in general representative form at 65 (FIG. 1). Tie rods 66 extend from the tractor body 11 rearwardly to the duct sections 38, 39. Generally the exact method of mounting the implement on the tractor is not important for appreciation of the present invention.

Power for operating the entire implement is received from a power take-off shaft 70 on the tractor and through a rearwardly projecting extension shaft 71 that is connected to the power take-off shaft. Rearwardly of the respective row units 25, 26, the shaft 71 is connected to the respective auger shafts 32L and 32R by means of belt drives 72, 73. Forwardly of the respective blowers 45, 46 the shaft 71 is provided with a pulley 75 and the blower shafts 47, 48 are provided with belt pulleys 76, 77. The belt 78 extends between the pulleys 75, 76. A second belt 79 extends between the pulleys 76, 77. Consequently the blower blades in the respective blowers 45, 46 are driven from the main power shaft 71. A pair of row unit drive shafts 80, 81 project over the axle structures 17 and are suitably supported on the body 11 of the tractor. The shafts 80, 81 are directly driven by the main shaft 71 through means of belt drives 82, 83 respectively. Suitable drive extensions extend from the forward ends of the respective shafts 80, 81 into the harvesting mechanism, not shown, in the respective harvesting units 25, 26.

While only one form of the invention has been shown, it should be recognized that other forms and variations will occur to those skilled in the art. Therefore while the preferred form has been shown and described for purposes of clearly and concisely illustrating the principles of the invention, it should be understood that there is no intention to limit or narrow the invention beyond the broad concepts set forth in the appended claims.

What is claimed is:

1. In a cotton harvester having a mobile frame movable forwardly over a field, and harvesting mechanism supported thereon and adapted to remove cotton bolls from the plants as it advances over the field, the combination therewith of a fore-and-aft extending conveying means including an elongated housing mounted adjacent the harvesting mechanism so as to receive the cotton bolls removed by said mechanism from the plants, the housing having a ripe boll outlet vertically offset from a green boll outlet, the latter being offset relative to the ripe boll outlet in a downstream relation in respect to the direction of movement of material in the housing; a duct extending from the housing and in communicating relation with the ripe boll outlet; and a blower supported by the frame having an air outlet opening into the duct in offset relation from the ripe boll outlet and directed away from the latter to effect suction of the ripe bolls through the ripe boll outlet.

2. The invention defined in claim 1 in which the blower outlet and ripe boll outlet open upwardly and are in side-by-side relation, and the duct opens downwardly for communication with both the outlets.

3. The invention defined in claim 1 in which the housing is an auger housing and supports an auger flight therein that moves the material from the harvesting mechanism to the ripe boll outlet and from thence to the green boll outlet.

4. The invention defined in claim 3 in which the auger flight has a reduced pitch adjacent the ripe boll outlet so as to reduce the rate of movement of the bolls as they pass the respective outlet.

5. The invention defined in claim 3 in which the auger flight has a portion adjacent the ripe boll outlet with agitating members extending from the face thereof to agitate the mixture of ripe and green bolls as it moves alongside the green boll outlet.

6. The invention defined in claim 1 in which the ripe boll outlet opens upwardly and the housing has a conveying device therein that includes agitating means beneath the ripe boll outlet for agitating the ripe and green bolls as they move beneath the ripe boll outlet.

7. The invention defined in claim 1 in which the conveying means includes a conveyor having flight means and the housing has air passage means in its floor at the location of the ripe boll outlet to permit passage of air through the flight means of the conveyor and through the green boll outlet.

8. The invention defined in claim 1 in which the housing has a terminal discharge end adjacent the green boll outlet, the latter outlet opens downwardly to permit gravitation of the green bolls, and further characterized by a green boll container disposed beneath the green boll outlet to catch the gravitating bolls.

9. The invention defined in claim 8 in which the ripe boll outlet opens upwardly and is closely adjacent but in offset relation to the green boll outlet.

10. In a cotton harvester having a mobile frame movable forwardly over a field, and harvesting mechanism supported thereon and adapted to remove a mixture of ripe and green cotton bolls from the plants as it advances over the field, the combination therewith of a conveying means extending from and for receiving a mixture of ripe and green bolls from the harvesting mechanism, and including an auger housing having a ripe boll outlet opening upwardly and a green boll outlet opening downwardly, the ripe boll outlet being offset from the green boll outlet whereby the mixture will pass beneath the ripe boll outlet prior to reaching the green boll outlet; a vertically disposed duct extending from the housing and in communicating relation with the ripe boll outlet; a blower supported by the frame opening into the duct and directed away from the ripe boll outlet to effect suction of the ripe bolls through the ripe boll outlet; and an auger flighting within the housing for delivering ripe and green bolls to the outlets.

11. In a cotton harvester having a mobile frame movable forwardly over a field, and harvesting mechanism supported thereon and adapted to remove a mixture of ripe and green cotton bolls from the plants as it advances over the field, the combination therewith of a conveying means extending from and for receiving a mixture of ripe and green bolls from the harvesting mechanism, and including an auger housing having a ripe boll outlet and a green boll outlet, the ripe boll outlet being offset from the green boll outlet whereby the mixture will pass adjacent the ripe boll outlet prior to reaching the green boll outlet; a duct extending from the housing and in communicating relation with the ripe boll outlet; a blower supported by the frame opening into the duct and directed away from the ripe boll outlet to effect suction of the ripe bolls through the ripe boll outlet; and an auger flight within the housing for delivering ripe and green bolls to the outlets.

12. The invention defined in claim 11 in which the blower has an outlet opening upwardly alongside the ripe boll outlet and directs air upwardly into the duct.

13. In a cotton harvester having a mobile unit with a fore-and-aft extending body and carried on front and rear wheels spaced from the body, and harvesting mechanism supported on the unit forward of the rear wheels adapted to remove cotton bolls from the plants as it advances over the field, the combination therewith of a fore-and-aft extending conveying means including an auger housing extending rearwardly from the harvesting mechanism to a rear portion rearwardly of the body, the housing having a ripe boll outlet opening upwardly and a green boll outlet opening downwardly, the latter being offset rearwardly from the former; a vertically disposed duct extending upwardly from the housing and in communicating relation with the ripe boll outlet; a blower supported by the frame offset from the housing and having an air outlet opening into the duct and directed away from the ripe boll outlet to effect suction of the ripe bolls through the ripe boll outlet; and an auger flighting within the housing for delivering ripe and green bolls from the harvester means to the outlets; and a green boll catcher beneath the green boll outlet for catching green bolls.

14. In a cotton harvester having a mobile vehicle with a fore-and-aft extending body and traction wheels spaced from the body and adapted to move the vehicle forwardly over a field, a pair of harvesting mechanisms supported on the vehicle forwardly of the wheels and adapted to remove cotton bolls from the plants as it advances over the field, the combination therewith of a pair of fore-and-aft extending conveying means including auger housings extending from the respective harvesting mechanisms rearwardly of the wheels and disposed between the wheels and body, each of the housings having a ripe boll outlet opening upwardly and a green boll outlet opening downwardly, the latter being offset rearwardly from the former; vertical duct means rearward of the wheels including a pair of ducts extending upwardly from the respective housings and in communicating relation with the respective ripe boll outlets; blower means supported by the frame offset from the housing and having air outlet means opening into the duct means directing air away from the ripe boll outlets to effect suction of the ripe bolls through the respective ripe boll outlets; and auger flightings within the housings for delivering ripe and green bolls from the harvester means to the outlets.

References Cited
UNITED STATES PATENTS

| | | | |
|---|---|---|---|
| 2,502,817 | 4/1950 | Bennett | 56—35 X |
| 2,654,201 | 10/1953 | Hyman | 56—33 X |
| 2,673,438 | 3/1954 | Miller et al. | 56—30 |
| 2,777,167 | 1/1957 | Knoth | 56—30 X |
| 2,825,195 | 3/1958 | Smith | 56—33 X |
| 2,861,298 | 11/1958 | Fowler | 56—12 X |

ANTONIO F. GUIDA, Primary Examiner.

RUSSELL R. KINSEY, Examiner.